United States Patent
Wright (10) Patent No.: US 10,703,457 B2
(45) Date of Patent: Jul. 7, 2020

(54) AIRCRAFT WITH A STRUT-BRACED FOLDABLE WING

(71) Applicant: AIRBUS OPERATIONS LIMITED, Bristol (GB)

(72) Inventor: Philip Wright, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 586 days.

(21) Appl. No.: 15/301,778

(22) PCT Filed: Apr. 2, 2015

(86) PCT No.: PCT/GB2015/051034
§ 371 (c)(1),
(2) Date: Oct. 4, 2016

(87) PCT Pub. No.: WO2015/150818
PCT Pub. Date: Oct. 8, 2015

(65) Prior Publication Data
US 2017/0113779 A1    Apr. 27, 2017

(30) Foreign Application Priority Data
Apr. 4, 2014 (GB) .................................. 1406095.8

(51) Int. Cl.
*B64C 3/58* (2006.01)
*B64C 3/56* (2006.01)
*B64D 29/02* (2006.01)

(52) U.S. Cl.
CPC ............... *B64C 3/56* (2013.01); *B64D 29/02* (2013.01); *Y02T 50/14* (2013.01)

(58) Field of Classification Search
CPC ............ B64C 3/56; B64D 29/02; Y02T 50/14
See application file for complete search history.

(56) References Cited

U.S. PATENT DOCUMENTS 1,457,222 A * 5/1923 Frey .................... B64C 3/56
                                                            244/49
1,495,029 A    5/1924 Moore
(Continued)

FOREIGN PATENT DOCUMENTS

DE        733 939        4/1943
EP      2 730 500        5/2014
(Continued)

OTHER PUBLICATIONS

International Search Report and Written Opinion of the ISA for PCT/GB2015/051034 dated Jun. 9, 2015, 9 pages.
(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

An aircraft (1) including a wing (5), the wing having an inner region (5a) and an outer region (5b), the inner and outer regions (5a, 5b) being connected by a hinge (11) defining a hinge line about which the outer region (5b) is foldable to reduce the span of the wing. The aircraft (1) includes an actuator (13) arranged to actuate the folding of the outer region (5b) of the wing with an actuation force. The wing (5) is braced by an external strut structure (9) for transferring some of the wing loadings in the outer region (5b) of the wing away from the inner region of the wing (5a). The actuator (13) is arranged to exert the actuation force via the strut structure (9).

17 Claims, 5 Drawing Sheets

(56) References Cited

U.S. PATENT DOCUMENTS

| | | | |
|---|---|---|---|
| 1,834,858 A * | 12/1931 | Metzler | B64C 3/42 244/47 |
| 1,910,611 A | 5/1933 | Kinner | |
| 2,343,645 A | 3/1944 | Dickinson et al. | |
| 2,666,602 A * | 1/1954 | Holland | B64C 3/56 244/49 |
| 3,138,351 A * | 6/1964 | Zuck | B64C 3/56 244/49 |
| 7,097,133 B2 | 8/2006 | Elam | |
| 2003/0094536 A1 * | 5/2003 | Labiche | B60F 5/02 244/2 |
| 2013/0292508 A1 | 11/2013 | Fox | |
| 2013/0327883 A1 * | 12/2013 | Kordel | B64C 3/56 244/49 |
| 2016/0001874 A1 * | 1/2016 | Pitt | B64C 3/52 244/174 |
| 2017/0029094 A1 * | 2/2017 | Lynas | B64C 3/546 |
| 2017/0137112 A1 * | 5/2017 | Winkelmann | B64C 3/56 |
| 2018/0086449 A1 * | 3/2018 | Sarigul-Klijn | B64C 31/02 |

FOREIGN PATENT DOCUMENTS

| | | | | |
|---|---|---|---|---|
| FR | 599 470 | | 1/1926 | |
| GB | 346 244 | | 4/1931 | |
| GB | 373 980 | | 6/1932 | |
| GB | 486758 A | * | 6/1938 | B64C 3/56 |
| GB | 490151 A | * | 8/1938 | B64C 3/56 |
| GB | 508 367 | | 6/1939 | |
| GB | 565 468 | | 11/1944 | |
| GB | 565468 A | * | 11/1944 | B64C 3/56 |
| WO | WO 2006/008330 | | 1/2006 | |

OTHER PUBLICATIONS

Search Report for GB1406095.8 dated Oct. 7, 2014, 1 page.
Search Report for GB1406095.8 dated Apr. 23, 2015, 1 page.

* cited by examiner

AIRCRAFT WITH A STRUT-BRACED FOLDABLE WING

RELATED APPLICATION

This application is the U.S. national phase of International Application PCT/GB2015/051034 filed Apr. 2, 2015, which designated the U.S. and claims priority to Great Britain Patent Application 1406095.8 filed Apr. 4, 2014, the entire contents of each of which are hereby incorporated by reference.

BACKGROUND OF THE INVENTION

The present invention relates to aircraft and more specifically to aircraft with a strut-braced foldable wing, and to methods of folding the wing on such an aircraft.

There is a trend towards increasingly fuel efficient passenger aircraft, for which it is desirable to have correspondingly large wing spans. However, the maximum aircraft span is often effectively limited by airport operating rules which govern various clearances required when manoeuvring around the airport (such as the span and/or ground clearance required for gate entry and safe taxiway usage).

In some suggested designs, aircraft are provided with wings which may be folded upwardly to reduce the span of the aircraft on the ground (compared to when the aircraft is configured for flight). However, a disadvantage with such arrangements is that they tend to be unduly heavy. For example, they may require high capacity (and therefore heavy) actuators to fold the wing. Alternatively or additionally, the wing structure near the folding joint may need to be significantly reinforced in order to withstand and transfer the wing loading across the joint.

Another problem encountered on large wing span aircraft, is that the magnitude of the bending moments generated at the wing root tend to be correspondingly large. The structure at the wing root must be sufficiently strong to withstand these large bending moments, which can lead to an undesirable weight increase in the aircraft.

To address this problem, it is known to provide aircraft with strut-braced wings in which a strut structure transfers wing loadings in the outer region of the wing, away from the inner region of the wing (and thus away from the wing root). Such an arrangement does not require the wing root structure to be as strong and can lead to a weight saving, which in some cases can be sufficient to offset the weight and/or drag penalties associated with the strut structure, especially for very large wingspan aircraft.

SUMMARY OF THE INVENTION

According to a first aspect of the invention, there is provided an aircraft comprising a wing, the wing comprising an inner region and an outer region, the inner and outer regions being connected by a hinge defining a hinge line about which the outer region is foldable to reduce the span of the wing, and the aircraft comprising an actuator arranged to actuate the folding of the outer region of the wing with an actuation force, wherein the wing is braced by an external strut structure for transferring some of the wing loadings in the outer region of the wing away from the inner region of the wing and characterised in that the actuator is arranged to exert the actuation force via the strut structure.

The invention recognises that the existence of a strut structure can be exploited when actuating a folding wing to reduce its span. More specifically, by exerting the actuation force (for folding the outer region of the wing) via the external strut structure, the nature of the actuation and the actuator, are no longer constrained by the geometry of the wing (for example its thickness) at the hinge, and therefore may be able to be of a lower capacity, and therefore lighter. This is especially beneficial where the wing is of relatively low thickness at the hinge. By virtue of the strut being external, it will be appreciated that the actuator is arranged to exert the actuation force to a location outside of the confines of the wing thickness.

The external strut structure is for transferring some of the wing loadings in the outer region of the wing away from the inner region of the wing. Thus, the strut structure is arranged to relieve the wing root bending moment.

The bending moment for folding the outer region of the wing is preferably effected by the actuation force acting about a moment arm that extends beyond the thickness of the wing. The invention recognises that when the aircraft comprises a strut structure external to the wing, this strut structure can be used to provide a load path that extends beyond the thickness of the wing; the moment arm need no longer be constrained by the thickness of the wing.

The actuator is preferably a linear actuator.

The actuator may be incorporated into the strut structure. For example, the actuator may be arranged to form part of the primary load path within the strut structure such that it transfers loads during flight (when the wing is unfolded). The actuator may be in the form of an extendable strut. The extendable strut may be connected at one end to the outer region of the wing, and connected at the other end to the strut structure. The extendable strut may be pivotably connected (for example via a pin joint) at one or both ends.

In some embodiments, the actuator may be ancillary to the strut structure, such that is lies off the primary load transfer path during flight. For example the actuator may be arranged to move the part of the strut structure through which the primary load path passes.

The strut structure may have an outer end. The outer end is preferably connected to the outer region of the wing. The outer end is preferably connected to the outer region of the wing at between 35% and 75% span, and more preferably between at between 40% and 70% span.

The strut structure may have an inner end. The inner end is preferably remote from the inner region of the wing. The inner end may bypass the fuselage and connect directly to the opposite wing, but more preferably it is connected to the aircraft fuselage. The inner end may be connected to the underside of the fuselage. The strut structure is preferably arranged such that some of the wing loadings, preferably the bending moments in the outer wing, are transferred to the fuselage.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

The aircraft may be in a mid-wing configuration, but is more preferably in a high-wing configuration.

The outer region of the wing may be part of the main wing. The outer region of the wing may be a wing tip device. In some embodiments, the outer region of the wing may be a part of the main wing to which a wing tip device is connected. The wing tip device may be a wing tip extension; for example the wing tip device may be a planar tip extension. In other embodiments, the wing tip device may comprise, or consist of, a non-planar device, such as a winglet.

The trailing edge of the inner region of the wing is preferably a continuation of the trailing edge of the outer region of the wing. The leading edge of the inner region of the wing is preferably a continuation of the leading edge of the outer region of the wing. The upper and the lower surfaces of the inner region of the wing are preferably continuations of the upper and lower surfaces of the outer region of the wing, such that there is a smooth transition from the inner region of the wing to the outer region of the wing.

The wing may be arranged such that the outer region is foldable downwards to reduce the span of the wing, but is more preferably arranged such that the outer region is foldable upwards to reduce the span of the wing.

The hinge line may lie substantially parallel to the plane of the wing. The hinge line preferably lies substantially within the plane of the wing.

According to another aspect of the invention, there is provided a method of folding a strut-braced wing on an aircraft, the wing comprising an inner region and an outer region, the inner and outer regions being connected by a hinge defining a hinge line about which the outer region is foldable to reduce the span of the wing, and wing being braced by an external strut structure for transferring some of the wing loadings in the outer region of the wing away from the inner region of the wing, characterised in that the method comprises the step of exerting an actuating force via the strut structure, such that the outer region of the wing folds about the hinge to reduce the span of the wing.

According to another aspect of the invention, there is provided a strut structure and actuator for use as the strut structure and actuator as described herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
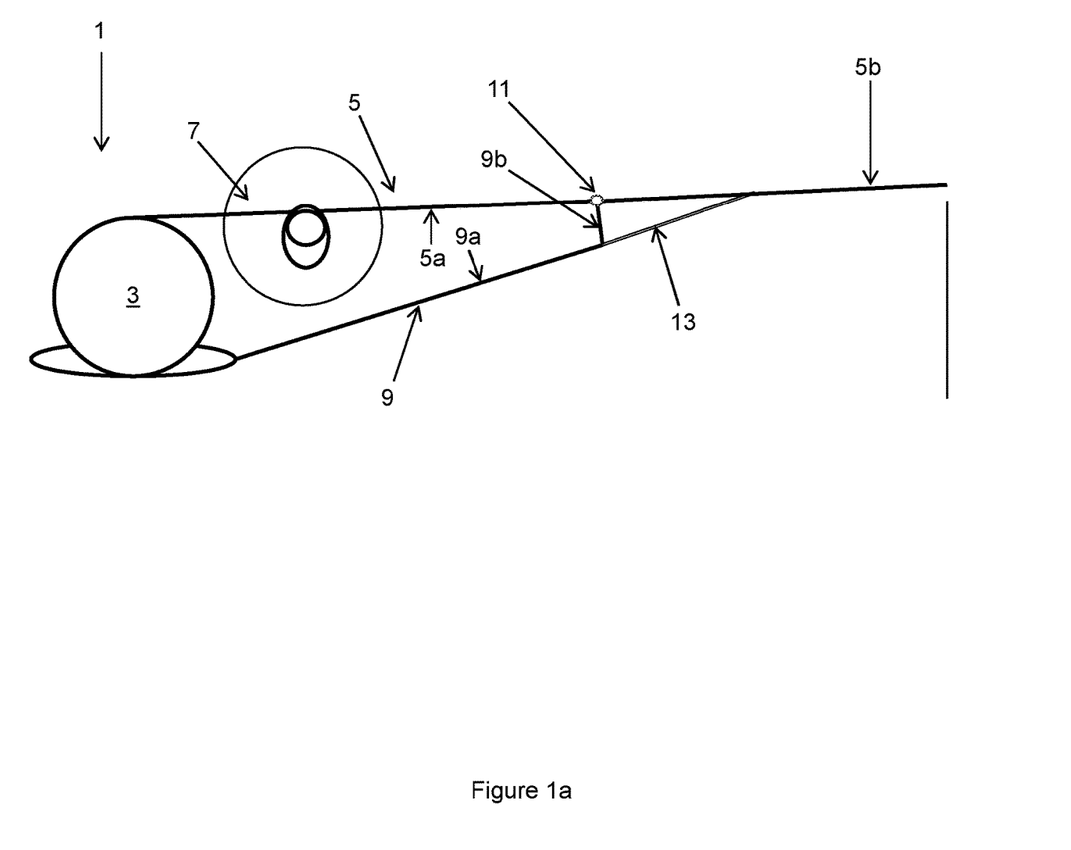
FIGS. 1a and 1b are a schematic frontal views of an aircraft with a strut-braced wing according to a first embodiment of the invention, the Figures shown the wing in an unfolded and folded configuration respectively.

FIG. 1a is a schematic front view of a passenger aircraft 1 according to a first embodiment of the invention. The aircraft 1 comprises a fuselage 3, a wing 5, an engine 7 and a strut structure 9. For the sake of clarity only one side of the aircraft is shown; it will be appreciated that a corresponding wing, strut structure etc. also exist on the other side of the fuselage.

The aircraft is in a high-wing configuration, and accordingly the wing 5 root joins the top of the fuselage 3. The aircraft 1 has a large wing span, and in order to relieve the loading at the wing root, and thus facilitate a lighter structure at said root, the wing 5 is braced against the underside of the fuselage 3 by the strut structure 9. The strut structure 9 comprises a main strut 9a extending from the fuselage 3 to an outer region 5b of the wing 5, and a jury strut 9b extending from part-way along the main strut 9a to the end of an inner region 5a of the wing 5.

Figure 1B:
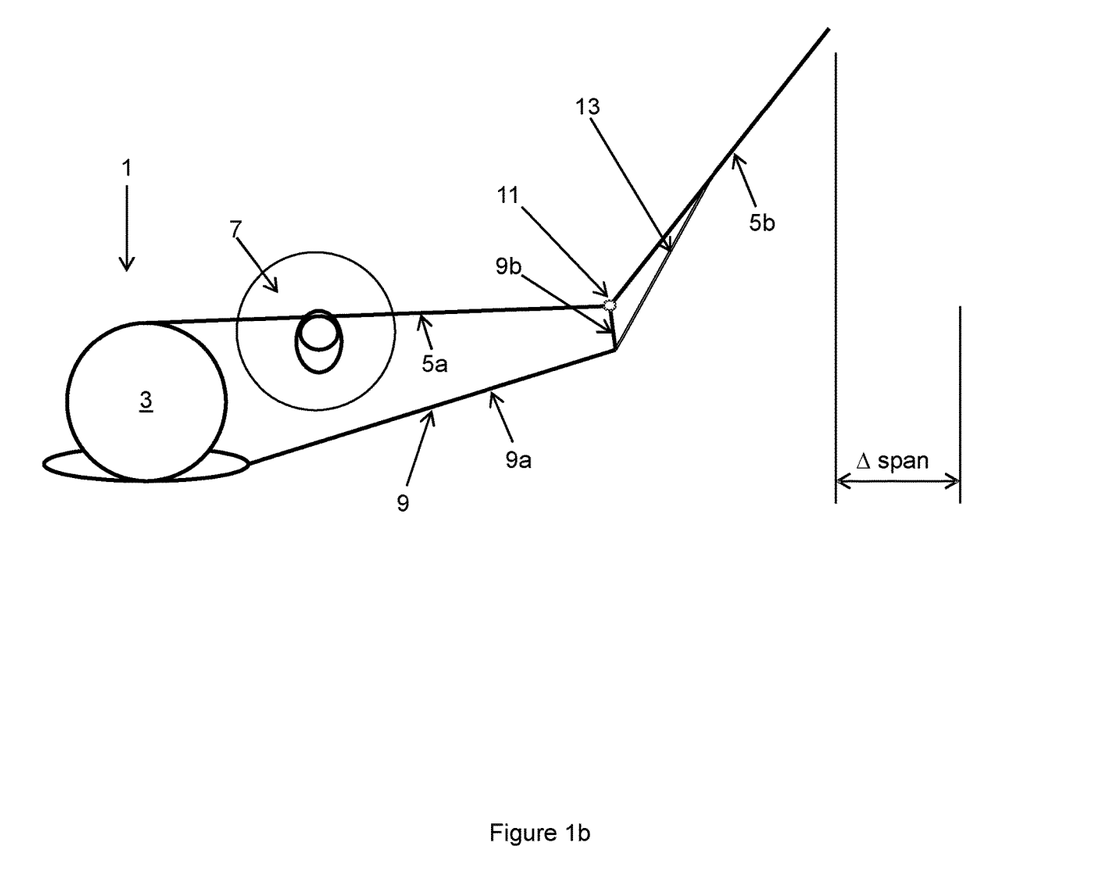

The aircraft has a wing span that is too large to comply with many airport operating rules which govern various clearances required when manoeuvring around the airport (such as the span and/or ground clearance required for gate entry and safe taxiway usage). Accordingly, the wing 5 is foldable about a hinge 11 between the inner region 5a and outer region 5b of the wing 5. FIG. 1b shows the wing in a folded configuration in which the outer region 5b is folded upwardly to reduce the span. The aircraft 1 is able to adopt this folded wing configuration after it has landed, in order to comply with, for example, airport gate limits.

A problem with folding wings in the prior art is that the actuator for folding the wing tends to be very heavy. The mechanism and the supporting structure may also be relatively inefficient. This is because the actuator must necessarily be contained within the wing thickness and, for example, it may have to act on a very small lever arm (less than the wing thickness) to fold the wing.

The first embodiment of the invention recognises that the existence of a strut structure can be exploited when actuating a folding wing. More specifically, the invention recognises that by exerting an actuation force (for folding the outer region 5b of the wing 5) via the strut structure 9, the nature of the actuation and the actuator, need no longer constrained by the geometry of the wing at the hinge, and therefore may be able to be of a lower capacity, and therefore lighter. This will now be demonstrated with reference to FIG. 1b.

FIG. 1b shows the wing in the folded configuration. Movement to this configuration is effected by a linear actuator 13 which has been incorporated into the strut structure 9 as an extendable strut (shown as two parallel lines). As the actuator 13 extends, it pushes the outer region 5b of the wing upwards such that it rotates about the hinge 11 (it will be appreciated that the actuator is pin jointed at either end such that it is pivotably connected at either end to the respective structures, thus allowing it to rotate. Since the actuation force acts via the strut structure 9 (i.e. along the length of the extendable strut) it is acts about a moment arm that extends beyond the thickness of the wing 5. The actuation force may therefore be relatively low, thereby increasing mechanical efficiency and enabling a lighter actuator to be used.

Figure 2A:
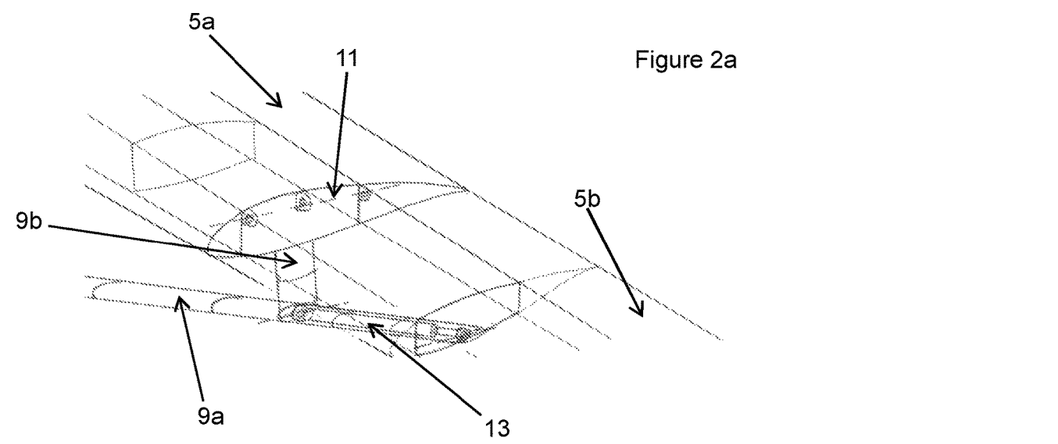
FIGS. 2a and 2b are perspective views showing part of the wing on the aircraft in FIGS. 1a and 1b.
Figure 2B:
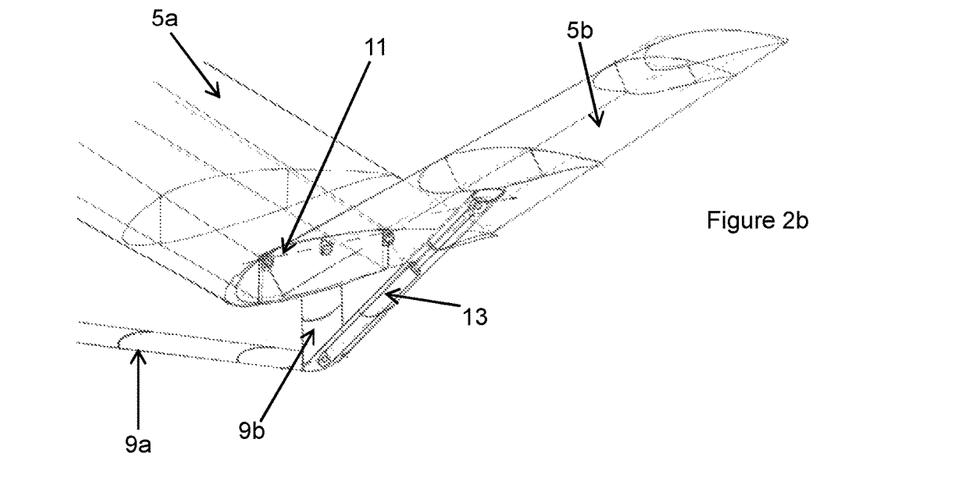

FIGS. 2a and 2b are close up perspective views of the hinge 11, jury strut 9b and actuator 13. As shown in the Figures, the strut structure has an aerodynamic fairing to minimise its friction and form drag. The actuator is an extendable piston within the fairing at the end of the main strut 9a. The end of the actuator is exposed (i.e. not covered by a fairing) when the wing is folded. However, this is not a problem because the wing is only folded when the aircraft is on the ground and stationary (or low speed taxiing).

Figure 3:
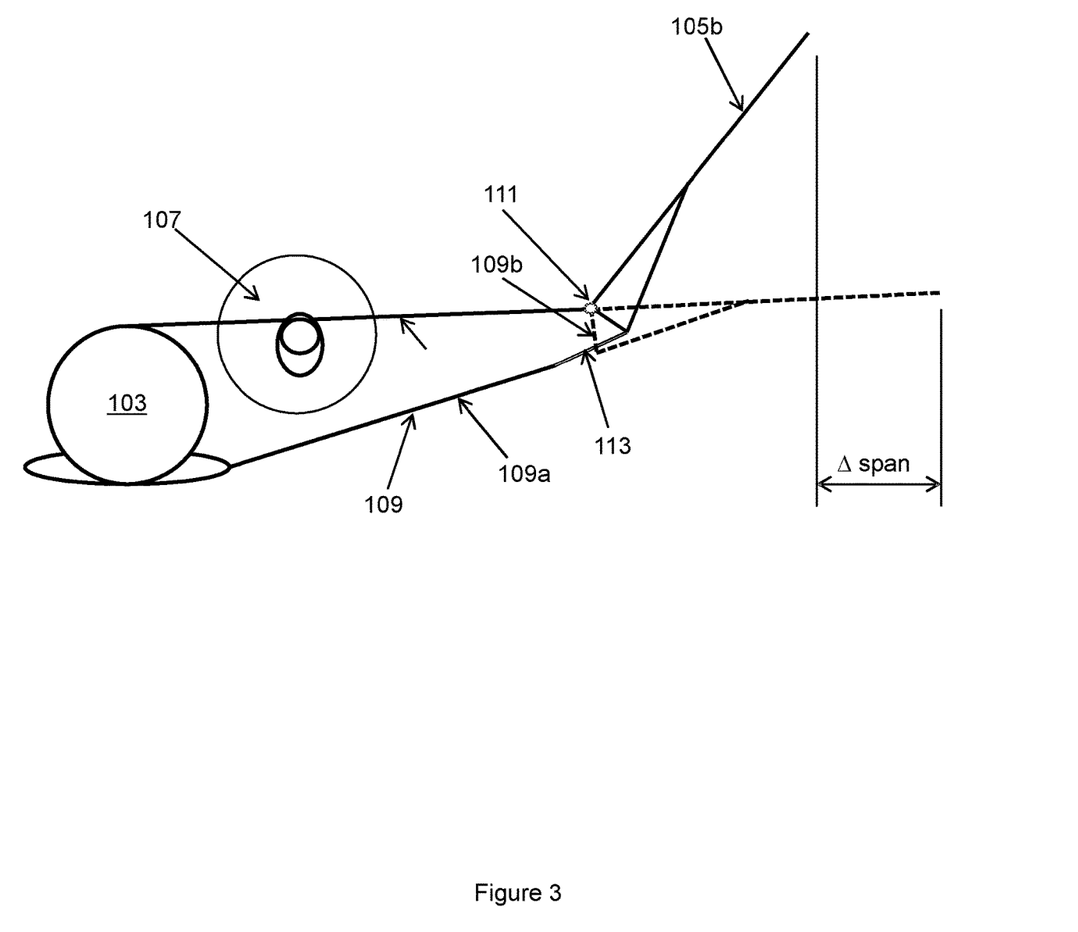
FIG. 3 is a schematic frontal view of an aircraft with a strut-braced wing according to a second embodiment of the invention.

FIG. 3 is a schematic front view of a passenger aircraft 101 according to a second embodiment of the invention. In FIG. 3, the wing 105 is shown both folded and unfolded (dotted lines) in the same picture to illustrate the folding movement. Features in the second embodiment of the invention that correspond to similar features in the first embodiment of the invention, are shown with the same reference numerals as in the first embodiment, but with the addition of the prefix '1' (or '10' where appropriate).

In contrast to the first embodiment, the actuator 113 (shown as two parallel lines) is instead inboard of the jury strut 109b and is arranged to push the distal end of the jury strut 109b about the hinge 111. The outer part of the strut structure 109 (including the jury strut 109b) is thus arranged to rotate as the wing is folded.

Figure 4:
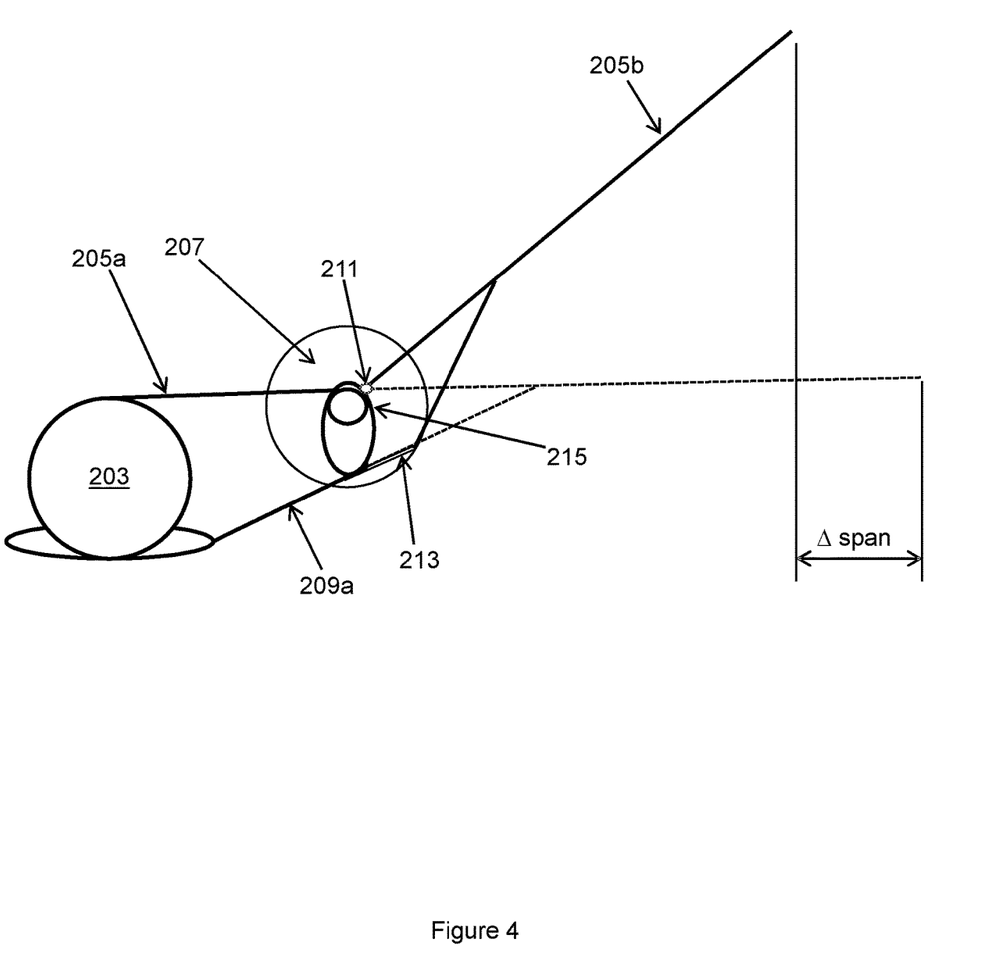
FIG. 4 is a schematic frontal view of an aircraft with a strut-braced wing according to a third embodiment of the invention.

FIG. 4 is a schematic front view of a passenger aircraft 201 according to a third embodiment of the invention. As with FIG. 3, the wing 205 is shown both folded and unfolded (dotted lines) in the same picture to illustrate the folding movement. Features in the third embodiment of the invention that correspond to similar features in the first embodiment of the invention, are shown with the same reference numerals as in the first embodiment, but with the addition of the prefix '2' (or '20' where appropriate).

In contrast to the first and second embodiments, engine nacelle 215 is used as a replacement of the jury strut. This avoids the drag penalty of using a separate jury strut. It also means that the outer region 205b of the wing is relatively large, such that only a small rotation about the hinge is required to achieve a notable span reduction (or for the same rotation, a larger span reduction is achieved).

Whilst the present invention has been described and illustrated with reference to particular embodiments, it will be appreciated by those of ordinary skill in the art that the invention lends itself to many different variations not specifically illustrated herein. By way of example the outer region of the wing may incorporate a wing tip device. The aircraft need not necessarily be a high-wing aircraft. The strut structure need not necessarily be the configuration illustrated and may be any arrangement that braces the wing. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing comprising a fixed wing and an outer wing region, wherein the fixed wing and outer wing region are connected by a hinge defining a hinge line about which the outer wing region is foldable to reduce the span of the wing, and the aircraft comprising a linear actuator arranged to actuate the folding of the outer wing region of the wing with respect to the fixed wing with an actuation force,
   wherein the wing is braced by an external strut structure for transferring some of the wing loadings in the outer wing region of the wing away from the fixed wing, wherein the external strut structure includes a main strut extending from the fuselage towards the linear actuator, and a jury strut extending from a region of the wing proximate the hinge and to at least one of the main strut and linear actuator,
   wherein the linear actuator is attached to the main strut and is arranged to exert the actuation force via the main strut, and
   wherein the linear actuator is pivotable with respect to the jury strut or the jury strut is pivotable with respect to the linear actuator.

2. The aircraft according to claim 1 wherein the linear actuator extends a portion of the main strut to pivot the outer wing region of the wing about the hinge.

3. The aircraft according to claim 1, wherein a bending moment for folding the outer wing region of the wing is effected by the actuation force acting about a moment arm that extends beyond the thickness of the wing.

4. The aircraft according to claim 2, wherein the linear actuator is included in an extendable strut attached to the main strut.

5. The aircraft according to claim 1, wherein the main strut has an inner end connected to the aircraft fuselage, such that some of the wing loadings in the outer wing region are transferred to the fuselage.

6. The aircraft according to claim 1 wherein the aircraft is a passenger aircraft.

7. A method of folding a strut-braced wing on an aircraft, the wing comprising a fixed wing and an outer wing region, the fixed wing and the outer wing region are connected by a hinge defining a hinge line about which the outer wing region is foldable about a tip of the fixed wing to reduce the span of the wing, and the wing being braced by an external strut structure configured to transfer some of the wing loadings in the outer wing region of the wing away from the fixed wing, wherein the external strut structure includes a main strut extending from the fuselage towards the linear actuator, and a jury strut extending from a region of the wing proximate the hinge and to at least one of the main strut and linear actuator,
   wherein the method comprises the step of exerting an actuating force via the linear actuator to the external strut structure, such that the outer wing region of the wing folds about the hinge to reduce the span of the wing and the linear actuator pivots with respect to the jury strut or the jury strut pivots with respect to the linear actuator.

8. An aircraft comprising:
   a fuselage;
   a wing including a fixed wing and an outer wing region, wherein the fixed wing is between the fuselage and the outer wing region along a span of the wing;
   a hinge joining the fixed wing to the outer wing region, wherein the outer wing region folds about the hinge and thereby reduces the span of the wing;
   an external strut structure extending from the fuselage towards the outer wing region, wherein the external strut structure is external to the wing and is configured to transfer wing loading forces from the outer wing region to the fuselage, wherein the external strut structure includes a main strut extending from the fuselage towards a linear actuator, and a jury strut extending from a region of the wing proximate the hinge and to at least one of the main strut and linear actuator, and
   the linear actuator is external to the wing and attached to the main strut and to the outer wing region, wherein the linear actuator is configured to apply an actuation force to fold the outer wing region about the hinge, wherein the linear actuator is pivotable with respect to the jury strut or the jury strut is pivotable with respect to the linear actuator.

9. The aircraft according to claim 8, wherein the linear actuator is mounted to the main strut at a joint between the main strut and the jury strut, wherein the jury strut is mounted to the fixed wing.

10. The aircraft according to claim 8, wherein the linear actuator extends from the main strut to the jury strut, wherein the jury strut is mounted to the outer wing region.

11. The aircraft according to claim 8, further comprising an engine nacelle attached to the fixed wing, and the jury strut is formed by the engine nacelle.

12. The aircraft according to claim 8, wherein the linear actuator extends in a linear movement.

13. The aircraft according to claim 9, wherein the linear actuator is an extendable strut included in the main strut.

14. The aircraft according to claim 8, wherein the aircraft is a passenger aircraft.

15. The aircraft according to claim 8, wherein the main strut extends below an engine mounted to the wing.

16. The aircraft according to claim 15, wherein the main strut extends through a nacelle housing the engine.

17. The aircraft according to claim 8, wherein the wing is attached to an upper region of the fuselage and the main strut is attached to a lower region of the fuselage.

* * * * *